United States Patent
Gerst et al.

(10) Patent No.: US 9,587,144 B2
(45) Date of Patent: Mar. 7, 2017

(54) PRESSURE-SENSITIVE ADHESIVE DISPERSION COMPRISING POLYMERS WITH UREIDO GROUPS OR UREIDO-ANALOGOUS GROUPS AND WITH GLYCIDYL GROUPS

(75) Inventors: Matthias Gerst, Maikammer (DE);
Dirk Wulff, Schifferstadt (DE);
Heinrich Harrer, Otterberg (DE)

(73) Assignee: BASF SE, Ludwigshafen (DE)

( * ) Notice: Subject to any disclaimer, the term of this patent is extended or adjusted under 35 U.S.C. 154(b) by 182 days.

(21) Appl. No.: 13/443,284

(22) Filed: Apr. 10, 2012

(65) Prior Publication Data

US 2012/0263950 A1    Oct. 18, 2012

Related U.S. Application Data

(60) Provisional application No. 61/475,672, filed on Apr. 15, 2011.

(30) Foreign Application Priority Data

Apr. 15, 2011 (EP) .................................. 11162533

(51) Int. Cl.
| | |
|---|---|
| C09J 4/00 | (2006.01) |
| C09J 133/14 | (2006.01) |
| C09J 7/02 | (2006.01) |
| C09J 133/08 | (2006.01) |
| C09J 133/12 | (2006.01) |
| C09J 109/06 | (2006.01) |
| C09J 139/04 | (2006.01) |
| C09J 133/02 | (2006.01) |
| C08F 2/22 | (2006.01) |
| C09J 133/06 | (2006.01) |

(52) U.S. Cl.
CPC .............. C09J 4/00 (2013.01); C09J 109/06 (2013.01); C09J 133/02 (2013.01); C09J 133/066 (2013.01); C09J 133/068 (2013.01); C09J 133/08 (2013.01); C09J 133/12 (2013.01); C09J 133/14 (2013.01); C09J 139/04 (2013.01); C08F 2/22 (2013.01); C09J 7/0217 (2013.01); C09J 2201/606 (2013.01); C09J 2433/00 (2013.01); Y10T 428/287 (2015.01)

(58) Field of Classification Search
None
See application file for complete search history.

(56) References Cited

U.S. PATENT DOCUMENTS

| | | | | |
|---|---|---|---|---|
| 3,222,419 | A * | 12/1965 | Jubilee et al. | 428/355 EP |
| 5,744,540 | A | 4/1998 | Baumstark et al. | |
| 5,908,908 | A * | 6/1999 | Vanhoye | C09J 133/064 526/286 |
| 6,031,038 | A | 2/2000 | Baumstark et al. | |
| 6,228,965 | B1 * | 5/2001 | Muta | C09J 7/026 428/461 |
| 6,319,992 | B1 * | 11/2001 | Mueller | C08F 265/06 525/301 |
| 6,605,662 | B2 * | 8/2003 | Zhao et al. | 524/458 |
| 7,070,051 | B2 * | 7/2006 | Kanner | A61B 17/06133 206/382 |
| 7,811,647 | B2 * | 10/2010 | Arimitsu | H01L 21/6835 428/343 |
| 2003/0118770 | A1 * | 6/2003 | Suwa et al. | 428/41.5 |
| 2004/0254551 | A1 * | 12/2004 | Carnes et al. | 604/367 |
| 2005/0187346 | A1 * | 8/2005 | Husemann | C08F 293/005 525/94 |
| 2008/0248299 | A1 * | 10/2008 | Kuwahara | C09J 133/04 428/355 R |

FOREIGN PATENT DOCUMENTS

| | | |
|---|---|---|
| CN | 1162324 A | 10/1997 |
| CN | 1829783 A | 9/2006 |
| CN | 101875828 A | 11/2010 |
| DE | 44 39 457 A1 | 4/1995 |
| DE | 103 42 616 A1 | 5/2005 |
| EP | 0 710 680 A2 | 5/1996 |
| EP | 0 822 206 A1 | 2/1998 |
| FR | 2804369 A1 * | 8/2001 ............... B32B 7/12 |
| JP | 2005-120164 | 5/2005 |
| WO | WO 01/54896 A2 | 8/2001 |

OTHER PUBLICATIONS

Aldrich Data Sheet (2015).*
Machinen translation of FR 2804369 A1 (2001).*
U.S. Appl. No. 13/443,044, filed Apr. 10, 2012, Gerst, et al.
International Search Report issued Jul. 27, 2012 in PCT/EP2012/056130 filed on Apr. 4, 2012 (with English translation of Category of Cited Documents).

* cited by examiner

*Primary Examiner* — Frank D Ducheneaux
(74) *Attorney, Agent, or Firm* — Oblon, McClelland, Maier & Neustadt, L.L.P.

(57) ABSTRACT

A description is given of a pressure-sensitive adhesive dispersion comprising a water-dispersed polymer P1 formed by emulsion polymerization. The polymer P1 is formed from a monomer mixture comprising (a) at least 40% by weight of C4 to C20 alkyl (meth)acrylates which when polymerized as homopolymers have a glass transition temperature of −30° C. or less, (b) at least 0.05% by weight of (meth) acrylate monomers having a substituent of the formula

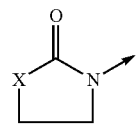

where X is $CH_2$, O, NH or NR and R is a C1 to C4 alkyl group, (c) at least 0.1% by weight of acid monomers. The monomer mixture comprises alternatively at least 0.05% by weight of glycidyl (meth)acrylate and/or the pressure-sensitive adhesive dispersion comprises at least one further polymer P2 which contains glycidyl groups.

15 Claims, No Drawings

PRESSURE-SENSITIVE ADHESIVE DISPERSION COMPRISING POLYMERS WITH UREIDO GROUPS OR UREIDO-ANALOGOUS GROUPS AND WITH GLYCIDYL GROUPS

CROSS-REFERENCE TO RELATED APPLICATIONS

This application is a Non-Provisional of U.S. Provisional No. 61/475,672 filed on Apr. 15, 2011. This application is based upon and claims the benefit of priority to European Application No. 11162533.1 filed on Apr. 15, 2011.

BACKGROUND OF THE INVENTION

Field of the Invention

The invention relates to a pressure-sensitive adhesive dispersion comprising a water-dispersed polymer P1 formed by emulsion polymerization from a monomer mixture comprising defined C4 to C20 alkyl (meth)acrylates, defined (meth)acrylate monomers with ureido groups or ureido-analogous substituents, acid monomers, and optionally further monomers, the monomer mixture alternatively further comprising glycidyl (meth)acrylate and/or the pressure-sensitive adhesive dispersion comprising at least one further polymer P2 which contains glycidyl groups.

Discussion of the Background

With pressure-sensitive adhesives (PSAs) there is a desire not only for effective adhesion to the substrate but also for sufficient cohesion (internal strength) within the layer of adhesive. Adhesion and cohesion are divergent performance properties. Measures taken to improve adhesion generally lead at the same time to a deterioration in cohesion, and vice versa. Many PSAs, while having sufficient cohesion at room temperature, do not have it at elevated temperatures. Many applications, particularly in the context of adhesive tapes for the fixing of components, as in the automobile sector or the construction sector, for example, nevertheless desire high cohesion even at relatively high temperatures, without too great a deterioration in the adhesion.

WO 01/54896 and EP 822206 describe PSAs comprising polymers which are obtainable by emulsion polymerization and are prepared from, among others, (meth)acrylic monomers with a ureido group. As compared with polymers without ureido groups, these polymers lead to improved shear strength (cohesion) and to improved adhesion even at elevated temperatures. It is desirable, however, to achieve further improvements in the thermal stability of adhesive products based on acrylate polymers. Though aqueous polymer dispersions produced inter alia from (meth)acrylic monomers with a ureido group are also described in EP 710680, they do not constitute pressure-sensitive adhesives.

BRIEF SUMMARY OF THE INVENTION

An object of the present invention was to further improve the adhesive properties of PSAs, particularly for adhesive tapes for the fixing of components, and to achieve an even better temperature stability of the adhesive properties. The PSAs are in particular to exhibit good cohesion even at elevated temperatures, with the adhesion being not too severely impaired, or even being increased. Accordingly, the PSA dispersions described in more detail below have been found.

DETAILED DESCRIPTION OF THE INVENTION

The invention provides a pressure-sensitive adhesive dispersion comprising at least one water-dispersed polymer P1 formed by emulsion polymerization from a monomer mixture comprising (a) at least 40% by weight of at least one C4 to C20 alkyl (meth)acrylate which when polymerized as a homopolymer has a glass transition temperature of −30° C. or less, preferably −40° C. or less, (b) at least 0.05% by weight of at least one (meth)acrylate monomer having a substituent of the formula

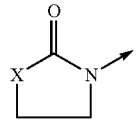

where X is $CH_2$, O, NH or NR and R is a C1 to C4 alkyl group, (c) at least 0.1% by weight of at least one acid monomer, and where alternatively the monomer mixture comprises at least 0.05% by weight of glycidyl (meth)acrylate and/or where the pressure-sensitive adhesive dispersion comprises at least one further polymer P2, different from polymer P1, and containing glycidyl groups, the figures for the monomer amounts being based in each case on the sum of all monomers.

The PSA dispersion of the invention comprises as a key constituent a polymer which is prepared by emulsion polymerization; the dispersed polymer is therefore an emulsion polymer.

In the text below, the term "(meth)acrylate" and similar terms are used as an abbreviational notation for "acrylate or methacrylate".

A PSA is a viscoelastic adhesive whose set film at room temperature (20° C.) in the dry state remains permanently tacky and adhesive. Bonding to substrates is accomplished instantaneously by gentle applied pressure. A PSA dispersion is a composition which comprises a polymer, in dispersion in water or an aqueous medium, that has pressure-sensitive adhesive properties.

The polymer P1 is prepared from a first monomer type (a). Monomer type (a) is present to an extent of at least 60% by weight, e.g., from 60% to 95% by weight, based on the total amount of the monomers used for preparing the polymer P1. The monomers (a) are selected from those of the C4 to C20 alkyl (meth)acrylates which, when polymerized as homopolymers, have a glass transition temperature of −30° C. or less or −40° C. or less, preferably of −45° C. or less. The glass transition temperature can be determined by known methods, an example being differential scanning calorimetry (see, for example, ASTM 3418/82, "midpoint temperature"). Preferred monomers (a) are $C_4$ to $C_{10}$ alkyl acrylates and $C_4$ to $C_{10}$ alkyl methacrylates, more particularly $C_4$ to $C_8$ alkyl acrylates and methacrylates. Especially preferred are n-butyl acrylate, n-hexyl acrylate, octyl acrylate, and 2-ethylhexyl acrylate, or else butadiene, and also mixtures of these monomers.

The polymer P1 is prepared from a second monomer type (b). Monomer type (b) is present to an extent of at least 0.05% by weight, e.g., from 0.1% to 5% by weight, preferably more than 1% by weight, e.g., from 1.5% to 5% by weight, based on the total amount of the monomers used for preparing the polymer P1.

Monomer type (b) is a (meth)acrylate monomer with a substituent of the formula

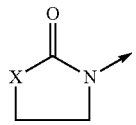

where X is $CH_2$, O, NH or NR and R is a C1 to C4 alkyl group, and the arrow on the N atom denotes the site of linkage of the substituent to the (meth)acrylate monomer. Where X is NH or NR, the monomer has a ureido group. Where X is O or $CH_2$, the monomers are termed monomers having a ureido-analogous group.

Monomers (b) are, for example, those of the formula

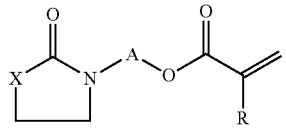

where X is as defined above, R is hydrogen or methyl, and A is a divalent linking group, preferably a C1 to C10 alkyl group or a C2 to C4 alkyl group. Particularly preferred are ureidoalkyl (meth)acrylates having 1 to 10 C atoms, preferably 2 to 4 C atoms, in the alkyl group, more particularly ureidoethyl methacrylate (UMA).

The polymer P1 is formed to an extent of at least 0.1% by weight, preferably in amounts of 0.1% to 5%, more preferably 0.2% to 4%, very preferably 0.5% to 3%, by weight, based on the total amount of monomers of the polymer P1, of acid monomers. Acid monomers are ethylenically unsaturated, radically polymerizable monomers which contain at least one acid group. Acid monomers are, for example, ethylenically unsaturated carboxylic acids, ethylenically unsaturated sulfonic acids, and vinylphosphonic acid. Ethylenically unsaturated carboxylic acids used are preferably alpha,beta-monoethylenically unsaturated monocarboxylic and dicarboxylic acids having 3 to 6 C atoms in the molecule. Examples of such are acrylic acid, methacrylic acid, itatonic acid, maleic acid, fumaric acid, crotonic acid, vinylacetic acid, and vinyllactic acid. Examples of suitable ethylenically unsaturated sulfonic acids include vinylsulfonic acid, styrenesulfonic acid, acrylamidomethylpropanesulfonic acid, sulfopropyl acrylate and sulfopropyl methacrylate. Preference is given to acrylic acid and methacrylic acid and their mixture, particular preference to acrylic acid.

The monomer mixture for forming the polymer P1 may optionally comprise further monomers (d), which are different from the monomers (a)-(c); in other words, the monomers (d) are monomers which when polymerized as homopolymers have a glass transition temperature of more than −30° C., in particular of more than −20° C., more than 0° C. or more than 20° C. Subject to these provisos, the monomers (d) may be selected from the non-(a) monomers C1 to C20 alkyl (meth)acrylates, C1 to C20 hydroxyalkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers. The monomers (d) are used preferably in amounts of 1% to 40% by weight, more particularly of 2% to 30% by weight, based on the total amount of monomers of the polymer P1. Examples include (meth)acrylic acid alkyl esters with a C1-C10 alkyl radical, such as methyl methacrylate, methyl acrylate, ethyl acrylate, ethyl methacrylate. Vinyl esters of carboxylic acids having 1 to 20 C atoms are, for example, vinyl laurate, vinyl stearate, vinyl propionate, Versatic acid vinyl esters, and vinyl acetate. Suitable vinylaromatic compounds include vinyltoluene, alpha- and para-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether and vinyl isobutyl ether. Vinyl ethers of alcohols comprising 1 to 4 C atoms are preferred. Hydrocarbons having 2 to 8 C atoms and one or two olefinic double bonds include ethylene, propylene, isoprene, and chloroprene. Particularly preferred as further monomers are methyl acrylate, methyl methacrylate, ethyl acrylate, styrene, C1-C10 hydroxyalkyl (meth)acrylates, and (meth)acrylamide, and also mixtures of these monomers. One embodiment uses 0%-5% by weight, preferably 0.05% to 5% by weight, of C1-C10 hydroxyalkyl (meth)acrylates.

The PSA dispersion of the invention comprises at least one polymer which is formed from monomers including at least one monomer having at least one glycidyl group. In one embodiment of the invention the polymer P1 is formed from at least one monomer (e) having at least one glycidyl group. In another embodiment of the invention there is a polymer blend composed of at least one polymer P1 and at least one polymer P2, the polymer P1 not being formed from monomers (e), and the polymer P2 being formed from at least one monomer (e) and optionally further monomers, but not from monomers of type (b). Also possible, of course, is a polymer blend of polymers P1 and P2 where both P1 and P2 are formed from monomers (e).

Preferred monomers (e) with glycidyl group are glycidyl (meth)acrylate (2,3-epoxypropyl (meth)acrylate). Particularly preferred is glycidyl methacrylate (GMA). If the monomer (e) is part of the monomer mixture for forming the polymer P1, then it is present preferably in an amount of 0.1% to 5% by weight, more particularly of 0.5% to 3% by weight, based on the total amount of monomers of the polymer P1. If the monomer (e) is part of the monomer mixture for forming the polymer P2, it is present preferably in an amount of 1% to 20% by weight, more particularly of 5% to 15% by weight, based on the total amount of monomers of the polymer P2.

One preferred polymer P1 is synthesized, for example, as follows from:
60% to 95% by weight of the monomers (a)
0.1% to 5% by weight of the monomers (b)
0.1% to 5% by weight of the acid monomers (c)
2% to 30% by weight of the further monomers (d) and
0.1% to 5% by weight of glycidyl (meth)acrylate.

One particularly preferred polymer P1 is synthesized, for example, as follows from:
75% to 90% by weight of the monomers (a)
0.5% to 3% by weight of the monomers (b)
0.5% to 2% by weight of the acid monomers (c)
2% to 20% by weight of the further monomers (d) and
0.5% to 3% by weight of glycidyl (meth)acrylate.

The glass transition temperature of the polymer P1 is preferably −60 to 0° C., more preferably −60 to −10° C., and very preferably −60 to −20° C.

The glass transition temperature can be determined by customary methods such as Differential Scanning calorimetry (ASTM 3418/82, "midpoint temperature").

One preferred polymer P2 is synthesized, for example, as follows from:
80% to 99% by weight of the monomers (a) and (d)
0.1% to 5% by weight of the acid monomers (c)
1% to 20% by weight of glycidyl (meth)acrylate.

In one embodiment of the invention the polymer P2 is formed by polymerization from a monomer mixture comprising the monomers (a), the monomers (c), glycidyl (meth)acrylate, and optionally the monomers (d), in the amounts specified for polymer P1.

The weight ratio of the monomer (b) (e.g., UMA) to the amount of the monomer (e) (e.g., GMA), or to the sum of the monomers (e) used for P1 and P2, is preferably 0.1 to 10, more preferably 0.2 to 5.

The polymers P1 and P2 may be prepared by emulsion polymerization, and are then emulsion polymers, with the above-identified ethylenically unsaturated, radically polymerizable monomers being polymerized by radically initiated emulsion polymerization in water. In order to support the dispersing of the monomers in the aqueous medium, it is possible to use the protective colloids and/or emulsifiers that are commonly employed as dispersants.

A comprehensive description of suitable protective colloids is found in Houben-Weyl, Methoden der organischen Chemie, volume XIV/1, Makromolekulare Stoffe [Macromolecular Compounds], Georg-Thieme-Verlag, Stuttgart, 1961, pages 411 to 420. Suitable emulsifiers include anionic, cationic, and nonionic interface-active substances, whose number-average molecular weight is typically below 2000 g/mol or preferably below 1500 g/mol, whereas the number-average molecular weight of the protective colloids is above 2000 g/mol, as for example from 2000 to 100 000 g/mol, more particularly from 5000 to 50 000 g/mol. As interface-active substances it is preferred to use anionic and nonionic emulsifiers. Suitable emulsifiers are, for example, ethoxylated $C_8$ to $C_{36}$ fatty alcohols having a degree of ethoxylation of 3 to 50, ethoxylated mono-, di-, and tri-$C_4$ to $C_{12}$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids. Cationic emulsifiers are, for example, compounds having at least one amino group or ammonium group and at least one C8-C22 alkyl group. If emulsifiers and/or protective colloids are used as assistants for the dispersing of the monomers, the amounts of them that are used are for example 0.1% to 5% by weight, based on the monomers. Trade names of emulsifiers are, for example, DOWFAX®2 A1, EMULAN® NP 50, DEXTROL® OC 50, EMULGATOR 825, EMULGATOR 825 S, EMULAN® OG, TEXAPON® NSO, NEKANIL® 904 S, LUMITEN® I-RA, LUMITEN E 3065, DISPONIL FES 77, LUTENSOL AT 18, STEINAPOL VSL, EMULPHOR NPS 25. The interface-active substance is used typically in amounts of 0.1% to 10% by weight, based on the monomers to be polymerized.

In the emulsion polymerization it is usual to use water-soluble initiators for the radical polymerization of the monomers. Water-soluble initiators for the emulsion polymerization are, for example, ammonium salts and alkali metal salts of peroxydisulfuric acid, e.g., sodium peroxodisulfate, hydrogen peroxide or organic peroxides, e.g., tert-butyl hydroperoxide. Also suitable are what are called reduction-oxidation (redox) initiator systems. The redox initiator systems consist of at least one, usually inorganic, reducing agent and an organic or inorganic oxidizing agent. The oxidizing component comprises, for example, the emulsion polymerization initiators already identified above. The reducing components comprise, for example, alkali metal salts of sulfurous acid, such as, for example sodium sulfite, sodium hydrogensulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to exist in a plurality of valence states. Typical redox initiator systems are, for example, ascorbic acid/iron(II) sulfate/sodium peroxydisulfate, tert-butyl hydroperoxide/sodium disulfite, tert-butyl hydroperoxide/Na hydroxymethanesulfinic acid. The individual components, the reducing component for example, may also be mixtures, an example being a mixture of the sodium salt of hydroxymethanesulfinic acid and sodium disulfite. The stated compounds are used usually in the form of aqueous solutions, with the lower concentration being determined by the amount of water that is acceptable in the dispersion, and the upper concentration by the solubility of the respective compound in water. Generally speaking, the concentration is 0.1% to 30% by weight, preferably 0.5% to 20% by weight, more preferably 1.0% to 10% by weight, based on the solution. The amount of the initiators is generally 0.1% to 10% by weight, preferably 0.5% to 5% by weight, based on the monomers to be polymerized. It is also possible for two or more different initiators to be used in the emulsion polymerization.

In the polymerization it is also possible to use polymerization regulators, known as chain transfer agents. Chain transfer agents bring about a chain termination reaction and thereby reduce the molar weight of the polymer. The chain transfer agents are attached to the polymer in this process, generally to the chain end. The amount of the chain transfer agents may amount in particular to 0.05 to 4 parts by weight, more preferably 0.05 to 0.8 part by weight, and very preferably 0.1 to 0.6 part by weight, per 100 parts by weight of the monomers to be polymerized. Suitable chain transfer agents are, in particular, compounds having a mercapto group such as tert-butyl mercaptan, ethyl thioglycolate, mercaptoethynol, mercaptopropyltrimethoxysilane or tert-dodecyl mercaptan. The chain transfer agents are generally low-molecular weight compounds having a molar weight of less than 2000, more particularly less than 1000 g/mol.

The emulsion polymerization takes place in general at 30 to 130, preferably 50 to 90° C. The polymerization medium may be composed alternatively just of water, or of mixtures of water and water-miscible liquids such as methanol, ethanol or tetrahydrofuran. It is preferred to use just water.

The monomer feed may take place as a batch operation, continuously or in stages. The feed process may be carried out in a staged or gradient regime. Preference is given to the feed process, in which a portion of the polymerization batch is introduced as an initial charge, heated to the polymerization temperature, and its polymerization commenced, and then the remainder of the polymerization batch, typically via two or more spatially separate feeds, of which one or more comprise the monomers in pure or emulsified form, is supplied to the polymerization zone continuously, in stages or subject to a concentration gradient, the polymerization being maintained during this supply process. In the polymerization it is also possible to include a polymer seed in the initial charge for the purpose, for example, of setting the particle size more effectively.

The manner in which the initiator is added to the polymerization vessel in the course of the radical aqueous emulsion polymerization is known to a person of ordinary skill in the art. It may alternatively be included in its entirety in the initial charge to the polymerization vessel, or else used continuously or in stages in accordance with the rate at which it is consumed in the course of the radical aqueous emulsion polymerization. In each individual case, this will be dependent on the chemical nature of the initiator system and on the polymerization temperature. It is preferred to include a portion in the initial charge and to supply the remainder to the polymerization zone at the rate of its consumption. If a molecular weight regulator is used, the regulator, or chain transfer agent, may also be included partly in the initial charge or added wholly or partly during the polymerization or toward the end of the polymerization.

For a high space/time yield of the reactor, dispersions with as high as possible a solids content are preferred. In order to be able to achieve solids contents >60% by weight, a bimodal or polymodal particle size ought to be brought about, since otherwise the viscosity becomes too high, and the dispersion can no longer be handled. Producing a new generation of particles can be done, for example, by adding seed (EP 81 083), by adding excess quantities of emulsifier, or by adding miniemulsions. A further advantage associated with the combination of low viscosity and high solids content is the improved coating behavior at high solids contents. Producing one or more new generations of particles can be done at any desired point in time. This point in time is guided by the particle size distribution that is desired for a low viscosity.

The monomers are preferably added continuously at least partly during the polymerization. In part, monomers may also be introduced as an initial charge in the polymerization vessel before the polymerization is commenced. It is preferred to include not more than 30% by weight of the total amount of the monomers, more preferably not more than 20% by weight, very preferably not more than 10% by weight of the monomers in the initial charge to the polymerization vessel. The remaining monomers, i.e., preferably at least 70% by weight, more preferably at least 80% by weight, very preferably at least 90% by weight, are added continuously during the polymerization. In one particular embodiment, no monomers are included in the initial charge; in other words, the entirety of the monomers is run in during the polymerization. In the case of the feed process, the individual components can be added to the reactor from above, at the side or from below, through the reactor base.

In one embodiment, polymer P1 is prepared in at least two stages, the amount of monomer (b) in a first polymerization stage being greater than the amounts of glycidyl (meth)acrylate, and the amount of monomer (b) in a later polymerization stage being less than the amount of glycidyl (meth)acrylate; in other words, the glycidyl monomer (e) is used predominantly (i.e., to an extent of more than half) or entirely only in the second polymerization stage. In another embodiment, polymer P1 is prepared in one stage, in which case the monomers (a) to (e) are polymerized simultaneously.

In order to remove the residual monomers it is also possible, after the end of the emulsion polymerization proper, i.e., after a conversion of all of the monomers, to add further initiator (chemical deodorization). In the case of emulsion polymerization, aqueous dispersions of the polymer are obtained generally with solids contents of 15% to 75% by weight, preferably of 40% to 75% by weight. The polymer thus prepared is used preferably in the form of its aqueous dispersion.

The size distribution of the dispersion particles may be monomodal, bimodal or multimodal. In the case of monomodal particle size distribution, the average particle size of the polymer particles dispersed in the aqueous dispersion is preferably less than 400 nm, more particularly less than 200 nm. With particular preference the average particle size lies between 140 and 200 nm. By average particle size here is meant the $d_{50}$ of the particle size distribution, i.e., 50% by weight of the total mass of all the particles have a particle diameter smaller than the $d_{50}$. The particle size distribution can be determined in a known way using the analytical ultracentrifuge (W. Mächtle, Makromolekulare Chemie 185 (1984), pages 1025-1039). In the case of bimodal or multimodal particle size distribution, the particle size can be up to 1000 nm. The pH of the polymer dispersion is set preferably to a pH of more than 4.5, more particularly to a pH of between 5 and 8.

The PSA dispersion of the invention may comprise additives. The additives are selected, for example, from fillers, dyes, flow control assistants, thickeners, preferably associative thickeners, defoamers, plasticizers, pigments, wetting agents, UV protectants, and tackifiers. For improved surface wetting, the PSAs may in particular comprise wetting assistants, examples being fatty alcohol ethoxylates, alkylphenol ethoxylates, sulfosuccinic esters, nonylphenol ethoxylates, polyoxyethylenes/-propylenes or sodium dodecylsulfonates. The amount is generally 0.05 to 5 parts by weight, more particularly 0.1 to 3 parts by weight, per 100 parts by weight of polymer (solid).

Tackifiers are known per se to the skilled person. They are additives for adhesives or elastomers that improve the autoadhesion (tack, intrinsic stickiness, self-adhesion) of these systems. They generally have a relatively low molar mass (Mn about 200-2000 g/mol), a glass transition temperature which lies above that of the elastomers, and sufficient compatibility with the latter; in other words, the tackifiers dissolve at least partly in polymer films formed from the elastomers. The amount by weight of the tackifiers is preferably 5 to 100 parts by weight, more preferably 10 to 50 parts by weight, per 100 parts by weight of polymer (solid/solid). Suitable tackifiers are, for example, those based on natural resins, such as rosins, for example. Tackifiers based on natural resins include the natural resins themselves and also their derivatives formed, for example, by disproportionation or isomerization, polymerization, dimerization or hydrogenation. They may be present in their salt form (with, for example, monovalent or polyvalent counterions (cations)), or, preferably, in their esterified form. Alcohols used for the esterification may be monohydric or polyhydric. Examples are methanol, ethanediol, diethylene glycol, triethylene glycol, 1,2,3-propanetriol, and pentaerythritol. Also finding use as tackifiers, furthermore, are phenolic resins, hydrocarbon resins, e.g., coumarone-indene resins, polyterpene resins, terpene oligomers, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, a-methylstyrene, vinyltoluene. Also being used increasingly as tackifiers are polyacrylates which have a low molar weight. These polyacrylates preferably have a weight-average molecular weight $M_w$ of below 30 000. The polyacrylates are composed preferably to an extent of at least 60%, more particularly at least 80%, by weight of $C_1$-$C_8$ alkyl (meth)acrylates. Preferred tackifiers are natural or chemically modified rosins. Rosins are composed predominantly of abietic acid or derivatives thereof.

PSA dispersions of the invention can be used for producing adhesive articles, or articles which have been rendered self-adhesive. The adhesive article may be a label. A preferred label is a self-adhesive paper label or film label, the adhesive being applied to paper or to a film as carrier material. The adhesive article may also be an adhesive tape, where the adhesive is applied to a tapelike carrier material. The carrier material of the adhesive tape may comprise woven or nonwoven fabrics, films, paper, felts, foams, and coextrudates, or combinations of these. Fields of application are carrierless, single-sided and double-sided adhesive tapes, medical adhesive tapes, adhesive packaging tapes, cable wrapping tapes, carpet laying tapes, adhesive assembly tapes, adhesive tapes for fixing roofing felt sheets, carrier materials which have been rendered self-adhesive, such as foams, for example, bitumen sheets, and the like. The invention accordingly also provides for the use of PSA dispersions of the invention for producing self-adhesive articles, more particularly for producing adhesive tapes for the fixing of components, more particularly in automobile construction, for electronics articles or in construction applications.

For the production of the adhesive articles, a layer of adhesive can be applied to the carrier material in a customary way, as for example by rolling, knife coating, spreading, etc. Where an aqueous adhesive dispersion is used, the water can be removed by drying at 50 to 150° C., for example. The coated substrates thus obtained are used, for example, as self-adhesive articles, such as labels, adhesive tapes or sheets. For this purpose, before or after the adhesive is applied, the carriers can be cut to form adhesive tapes, labels or sheets. For subsequent use, the PSA-coated side of the substrates may be lined with a release paper, such as with a siliconized paper, for example.

The invention also provides an adhesive tape which has at least one carrier layer and is coated on one or both sides with at least one PSA dispersion of the invention. Preferred carrier materials for producing adhesive tapes are polyethylene (PE), oriented polypropylene (oPP), polyethylene terephthalate (PET), PE foam, and polyurethane foam (PU foam).

For the production of adhesive tapes, the application weight of the PSA dispersion, based on solids content, is preferably at least 20 g/m² or at least 30 g/m², e.g., 60 to 80 g/m².

One embodiment of the invention is an adhesive tape where the material of the carrier layer is selected from PE, oPP, PET, PE foam, and PU foam and/or the adhesive tape has at least one detachable protective layer lining the layer of adhesive.

The adhesive articles of the invention have very good adhesive-bonding properties, and particularly a good thermal stability.

EXAMPLES

Materials Used nBA n-butyl acrylate
MMA methyl methacrylate
UMA ureidomethacrylate (2-(2-oxoimidazolidin-1-yl)ethyl methacrylate)
AA acrylic acid
HPA 2-hydroxypropyl acrylate
Seed 30 nm styrene seed
GMA glycidyl methacrylate (2,3-epoxypropylmethacrylate)

Example 1

Noninventive PSA dispersions D1 to D3 were prepared by emulsion polymerization from the monomer compositions shown in Table 1.

TABLE 1

Monomer compositions for preparing the PSA dispersions D1 to D3, amounts in parts by weight

|         | D1    | D2    | D3    |
|---------|-------|-------|-------|
| Seed    | 0.4   | 0.4   | 0.4   |
| nBA     | 87.75 | 87.75 | 87.75 |
| MMA     | 7.8   | 6.8   | 5.85  |
| UMA     | —     | 1.0   | 1.95  |
| AA      | 1.5   | 1.5   | 1.5   |
| Styrene | 1.0   | 1.0   | 1.0   |
| HPA     | 1.95  | 1.95  | 1.95  |

Performance Tests:

The PSAs were coated with a coat weight of 75 g/m² onto Hostaphan® RN 36 PET film as carrier, and dried at 90° C. for 5 minutes. The PSA-coated carrier was slit to give test strips 25 mm wide.

a) Shear Strength

For the determination of the shear strength, the test strips were adhered with a bonded area of 25×25 mm to sheet steel, rolled on once with a roller weighing 1 kg, and then loaded in suspension with a 1 kg weight. The shear strength (cohesion) was determined under standard conditions (23° C.; 50% relative humidity) and at 70° C. The measure of the shear strength is the time, in hours, taken for the weight to fall off; in each case, the average was calculated from 5 measurements.

b) S.A.F.T. Test

The test strips were adhered with a bonded area of 25×25 mm to AFERA steel, rolled on 4 times using a roller weighing 2 kg, and, after a contact time of at least 16 hours, loaded in suspension with a 1 kg weight. In the course of loading, heating took place continuously, starting from 23° C., at a rate of 0.5° C./min. The heating temperature reached at the point when the weight fell off is a measure of the thermal stability of the adhesive. In each case the average was calculated from three measurements.

The test results are summarized in Table 2.

TABLE 2

Test results D1-D3

|              | Shear strength 23° C. [hours] | Shear strength 70° C. [hours] | S.A.F.T. test |
|--------------|-------------------------------|-------------------------------|---------------|
| D1 (no UMA)  | 0.7                           | 0.1                           | 38° C.        |
| D2 (1 pphm UMA) | >100                       | 8.2                           | 121° C.       |
| D3 (2 pphm UMA) | >100                       | 4.8                           | 121° C.       | pphm: parts per hundred parts monomer;
parts by weight per 100 parts by weight of monomer The results show that using a monomer of type b) results in an adhesive with improved but still not optimum thermal stability. Increasing the amount of monomer b) used does not provide any further improvement.

Example 2

Dispersions D4 to D13 were prepared. The overall compositions are summarized in Tables 3 and 4.

Dispersion D4:

The noninventive PSA dispersion D4 with monomodal particle distribution was prepared by emulsion polymerization from the monomer composition shown in Table 3.

Dispersion D5:

The inventive PSA dispersion D5 with monomodal particle distribution was prepared by emulsion polymerization in two stages, polymerizing first 80 parts by weight of a monomer emulsion 1 and then 20 parts by weight of a monomer emulsion 2.

Monomer emulsion 1: 87.5 parts by weight of n-BA, 2 parts by weight of UMA, 6 parts by weight of MMA, 2 parts by weight of HPA, 1 part by weight of styrene, 1.5 parts by weight of AA Monomer emulsion 2: 51 parts by weight of n-BA, 10 parts by weight of GMA, 37 parts by weight of MMA, 2 parts by weight of AA Dispersion D6:

As for dispersion D5, polymerizing first 90 parts by weight of the monomer emulsion 1 and then 10 parts by weight of the monomer emulsion 2.

Dispersion D7:

The noninventive PSA dispersion D7 with bimodal particle distribution was prepared like D4, with the difference that 1.6 pphm of additional seed were added after 60% monomer emulsion feed.

Dispersion D8:

The inventive PSA dispersion D8 with bimodal particle distribution was prepared like D5, with 1.6 pphm of additional seed being added after 60% monomer emulsion feed.

Dispersion D9:

The inventive PSA dispersion D9 with bimodal particle distribution was prepared like D6, with 1.6 pphm of additional seed being added after 60% monomer emulsion feed.

Dispersion D10:

Like dispersion D5,

Monomer emulsion 2: 86.5 parts by weight of n-BA, 10 parts by weight of GMA, 2 parts by weight of HPA, 1.5 parts by weight of AA Dispersion D11:

Like dispersion D6,

Monomer emulsion 2: 86.5 parts by weight of n-BA, 10 parts by weight of GMA, 2 parts by weight of HPA, 1.5 parts by weight of AA Dispersion D12:

Like dispersion D8,

Monomer emulsion 2: 86.5 parts by weight of n-BA, 10 parts by weight of GMA, 2 parts by weight of HPA, 1.5 parts by weight of AA Dispersion D13:

Like dispersion D9,

Monomer emulsion 2: 86.5 parts by weight of n-BA, 10 parts by weight of GMA, 2 parts by weight of HPA, 1.5 parts by weight of AA

TABLE 3

Monomer compositions for preparing the PSA dispersions D4 to D13, amounts in parts by weight

|  | D4 | D5 | D6 | D7 | D8 | D9 |
|---|---|---|---|---|---|---|
| PSD | monomodal | mono-modal | mono-modal | bimodal | bimodal | bimodal |
| Seed | 0.4 | 0.4 | 0.4 | 2 | 2 | 2 |
| nBA | 87.75 | 80.4 | 84.1 | 87.75 | 80.4 | 84.1 |
| MMA | 5.85 | 12.1 | 9.0 | 5.85 | 12.1 | 9.0 |
| UMA | 1.95 | 1.56 | 1.76 | 1.95 | 1.56 | 1.76 |
| AA | 1.5 | 1.6 | 1.55 | 1.5 | 1.6 | 1.55 |
| Styrene | 1 | 0.8 | 0.9 | 1 | 0.8 | 0.9 |
| HPA | 1.95 | 1.56 | 1.76 | 1.95 | 1.56 | 1.76 |
| GMA | — | 2 | 1 | — | 2 | 1 |

PSD: modality of the particle size distribution

TABLE 4

Monomer compositions for preparing the PSA dispersions D4 to D13, amounts in parts by weight

|  | D10 | D11 | D12 | D13 |
|---|---|---|---|---|
| PSD | monomodal | monomodal | bimodal | bimodal |
| Seed | 0.4 | 0.4 | 2 | 2 |
| nBA | 87.5 | 87.6 | 87.5 | 87.6 |
| MMA | 4.7 | 5.3 | 4.7 | 5.3 |
| UMA | 1.56 | 1.76 | 1.56 | 1.76 |
| AA | 1.5 | 1.5 | 1.5 | 1.5 |
| Styrene | 0.8 | 0.9 | 0.8 | 0.9 |
| HPA | 1.96 | 1.96 | 1.96 | 1.96 |
| GMA | 2 | 1 | 2 | 1 |

PSD: modality of the particle size distribution

The results of the applications tests are summarized in Table 5.

TABLE 5

Test results, D4-D13

|  | Shear strength 23° C. [hours] | Shear strength 70° C. [hours] | S.A.F.T. test |
|---|---|---|---|
| D4 (no GMA) | >100 | 11.1 | 114° C. |
| D5 (2 pphm GMA) | >100 | >100 | >180° C. |
| D6 (1 pphm GMA) | >100 | >100 | >180° C. |
| D7 (no GMA) | >100 | 5.7 | 110° C. |
| D8 (2 pphm GMA) | >100 | >100 | >180° C. |
| D9 (1 pphm GMA) | >100 | >100 | >180° C. |
| D10 (2 pphm GMA) | >100 | >100 | >180° C. |
| D11 (1 pphm GMA) | >100 | >100 | >180° C. |
| D12 (2 pphm GMA) | >100 | >100 | >180° C. |
| D13 (1 pphm GMA) | >100 | >100 | >180° C. |

The results show that using a monomer of type b) in combination with a monomer containing glycidyl groups results in a significantly improved thermal stability on the part of the adhesive.

The invention claimed is:

1. A pressure-sensitive adhesive dispersion, comprising a water-dispersed polymer P1 formed by emulsion polymerization from a monomer mixture comprising:
   75 to 90% by weight of n-butyl acrylate;
   more than 1% by weight and up to 3% by weight of ureidoethyl methacrylate;
   0.5 to 2% by weight of (meth)acrylic acid;
   1 to 3% by weight of hydroxypropyl acrylate;
   0.1 to 2% by weight of glycidyl methacrylate; and
   2 to 20% by weight of at least one additional monomer selected from the group consisting of methyl methacrylate and styrene,
   wherein:
   monomer amounts are based in each case on a sum of all monomers;
   a pressure-sensitive adhesive, formed by coating a PET carrier with the pressure-sensitive adhesive dispersion and drying, exhibits a shear strength value at 70° C. of more than 100 hours for 25×25 mm test strips of the coated PET carrier adhered to steel; and
   the pressure-sensitive adhesive exhibits an SAFT-test value of more than 180° C. for the 25×25 mm test strips of the coated PET carrier adhered to the steel.

2. The pressure-sensitive adhesive dispersion according to claim 1, wherein the monomer mixture further comprises an additional monomer selected from the group consisting of a C1 to C20 alkyl (meth)acrylate, which is different from the n-butyl acrylate, a C1 to C20 hydroxyalkyl (meth)acrylate which is different from the hydroxypropyl acrylate, a vinyl ester of a carboxylic acid comprising up to 20 C atoms, a vinylaromatic having up to 20 C atoms, an ethylenically unsaturated nitrile, a vinyl halide, a vinyl ether of an alcohol comprising 1 to 10 C atoms, an aliphatic hydrocarbon having 2 to 8 C atoms and one or two double bonds, and a mixture thereof.

3. The pressure-sensitive adhesive dispersion according to claim 1, wherein the pressure-sensitive adhesive dispersion further comprises an additive selected from the group consisting of a filler, a dye, a flow control assistant, a thickener, a defoamer, a plasticizer, a pigment, a wetting agent, a UV protectant, and a tackifier.

4. The pressure-sensitive adhesive dispersion according to claim 1, further comprising a polymer P2, which is formed by polymerization from a monomer mixture, and the polymer P2 comprises:
   at least 60% by weight of a C4 to C20 alkyl (meth) acrylate;
   at least 0.1% by weight of a acid monomer;
   glycidyl methacrylate; and
   optionally an additional monomer selected from the group consisting of a C1 to C20 alkyl (meth)acrylate, which is different from the C4 to C20 alkyl (meth)acrylate, a C1 to C20 hydroxyalkyl (meth)acrylate, a vinyl ester of a carboxylic acid comprising up to 20 C atoms, a vinylaromatic having up to 20 C atoms, an ethylenically unsaturated nitrile, a vinyl halide, a vinyl ether of an alcohol comprising 1 to 10 C atoms, an aliphatic hydrocarbon having 2 to 8 C atoms and one or two double bonds, and a mixture thereof.

5. The pressure-sensitive adhesive dispersion according to claim 1, wherein:
   the polymer P1 is prepared by a process comprising a first polymerizing and a second polymerizing;
   an amount of the ureidoethyl methacrylate in the first polymerizing is greater than amounts of the glycidyl methacrylate; and
   in the second polymerizing, the amount of the ureidoethyl methacrylate is less than the amount of the glycidyl methacrylate.

6. The pressure-sensitive adhesive dispersion of claim 1, comprising the water-dispersed polymer P1 formed by emulsion polymerization from a monomer mixture consisting essentially of:
   75 to 90% by weight of the n-butyl acrylate;
   more than 1% by weight and up to 3% by weight of the ureidoethyl methacrylate;
   0.5 to 2% by weight of the (meth)acrylic acid;
   1 to 3% by weight of the hydroxypropyl acrylate;
   0.1 to 2% by weight of the glycidyl methacrylate; and
   2 to 20% by weight of the at least one additional monomer selected from the group consisting of the methyl methacrylate and the styrene.

7. An adhesive tape, comprising a carrier layer, wherein the carrier layer is coated on one or both sides with at least one of the pressure-sensitive adhesive dispersion according to claim 1.

8. The adhesive tape according to claim 7, wherein an applied weight of the pressure-sensitive adhesive dispersion, based on solids content, is at least 30 g/m$^2$.

9. The adhesive tape according to claim 7, wherein either:
   the carrier layer is selected from the group consisting of polyethylene, oriented polypropylene, polyethylene terephthalate, PE foam, and polyurethane foam, or
   the adhesive tape comprises a detachable protective layer lining a layer of adhesive,
   or both.

10. A method for producing a self-adhesive article, the method comprising producing the self-adhesive article with the pressure-sensitive adhesive dispersion according to claim 1.

11. A method for fixing a component for an electronics article or in a construction application, the method comprising fixing the component with the pressure-sensitive adhesive dispersion according to claim 1.

12. The method according to claim 11, wherein the component is suitable for automobile construction.

13. A method for fixing a component for an electronics article or in a construction application, the method comprising fixing the component with the adhesive tape according to claim 7.

14. The method according to claim 13, wherein the component is suitable for automobile construction.

15. A pressure-sensitive adhesive dispersion, comprising a water-dispersed polymer P1 formed by emulsion polymerization from a monomer mixture comprising:
   80.4 to 87.6% by weight of n-butyl acrylate;
   1.56 to 1.75% weight of ureidoethyl methacrylate;
   1.5 to 1.6% by weight of (meth)acrylic acid;
   1.56 to 1.96% by weight of hydroxypropyl acrylate;
   1 to 2% by weight of glycidyl methacrylate; and
   5.5 to 12.9% by weight of at least one additional monomer selected from the group consisting of methyl methacrylate and styrene,
   wherein:
   monomer amounts are based in each case on a sum of all monomers;
   a pressure-sensitive adhesive, formed by coating a PET carrier with the pressure-sensitive adhesive dispersion and drying, exhibits a shear strength value at 70° C. of more than 100 hours for 25×25 mm test strips of the coated PET carrier adhered to steel; and
   the pressure-sensitive adhesive exhibits an SAFT-test value of more than 180° C. for the 25×25 mm test strips of the coated PET carrier adhered to the steel.

* * * * *